United States Patent
Zhang

(10) Patent No.: US 12,111,785 B2
(45) Date of Patent: Oct. 8, 2024

(54) PCIE DEVICE, APPARATUS, AND METHOD WITH DIFFERENT BANDWIDTHS COMPATIBLE IN SAME SLOT

(71) Applicant: INSPUR SUZHOU INTELLIGENT TECHNOLOGY CO., LTD., Jiangsu (CN)

(72) Inventor: Jie Zhang, Jiangsu (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 140 days.

(21) Appl. No.: 17/928,312

(22) PCT Filed: Jan. 25, 2021

(86) PCT No.: PCT/CN2021/073478
§ 371 (c)(1),
(2) Date: Nov. 29, 2022

(87) PCT Pub. No.: WO2021/238268
PCT Pub. Date: Dec. 2, 2021

(65) Prior Publication Data
US 2023/0214348 A1 Jul. 6, 2023

(30) Foreign Application Priority Data
May 29, 2020 (CN) .......................... 202010472093.3

(51) Int. Cl.
G06F 13/42 (2006.01)
G06F 13/40 (2006.01)
(52) U.S. Cl.
CPC ...... G06F 13/4221 (2013.01); G06F 13/4081 (2013.01); *G06F 2213/0026* (2013.01)

(58) Field of Classification Search
CPC ............ G06F 13/4081; G06F 13/4221; G06F 2213/0026
See application file for complete search history.

(56) References Cited

U.S. PATENT DOCUMENTS

| | | | |
|---|---|---|---|
| 7,174,411 B1 * | 2/2007 | Ngai | G06F 13/4022 710/316 |
| 10,248,607 B1 * | 4/2019 | Davis | G06F 13/4221 |

(Continued)

FOREIGN PATENT DOCUMENTS

| | | |
|---|---|---|
| CN | 104345826 A | 2/2015 |
| CN | 105183683 A | 12/2015 |

(Continued)

OTHER PUBLICATIONS

Corresponding International Patent Application No. PCT/CN2021/073478, International Search Report, Date Mailed Apr. 30, 2021.

(Continued)

*Primary Examiner* — Eric T Oberly
(74) *Attorney, Agent, or Firm* — Cooper Legal Group, LLC

(57) ABSTRACT

A Peripheral Component Interconnect Express (PCIE) device, apparatus, and method with different PCIE bandwidths compatible in the same PCIE slot. The device includes a PCIE single board. A first core chip corresponding to a first PCIE XN device and a second core chip corresponding to a second PCIE XN device are arranged on the PCIE single board. An XN+XN gold finger is further arranged on a body of the PCIE single board. The XN+XN gold finger is formed by two XN gold fingers.

17 Claims, 3 Drawing Sheets

(56) References Cited

U.S. PATENT DOCUMENTS

| | | | | |
|---|---|---|---|---|
| 10,445,277 B1* | 10/2019 | Lan | ...................... | G06F 13/1668 |
| 2007/0139423 A1* | 6/2007 | Kong | ...................... | G09G 5/363 |
| | | | | 710/306 |
| 2009/0006659 A1 | 1/2009 | Collins et al. | | |
| 2010/0100657 A1* | 4/2010 | Ji | ......................... | G06F 13/385 |
| | | | | 710/300 |
| 2021/0263875 A1* | 8/2021 | Lin | ....................... | G06F 9/4411 |

FOREIGN PATENT DOCUMENTS

| | | |
|---|---|---|
| CN | 106959932 A | 7/2017 |
| CN | 108763124 A | 11/2018 |
| CN | 108959154 A | 12/2018 |
| CN | 110166301 A | 8/2019 |
| CN | 110221999 A | 9/2019 |
| CN | 110389916 A | 10/2019 |
| CN | 210006040 U | 1/2020 |
| CN | 111008162 A | 4/2020 |
| CN | 111159085 A | 5/2020 |
| CN | 111752871 A | 10/2020 |

OTHER PUBLICATIONS

Corresponding International Patent Application No. PCT/CN2021/073478, Written Opinion, Date Mailed Apr. 19, 2021.
Corresponding Chinese Patent Application No. 202010472093.3, First Office Action, dated Aug. 11, 2021.

* cited by examiner

PCIE DEVICE, APPARATUS, AND METHOD WITH DIFFERENT BANDWIDTHS COMPATIBLE IN SAME SLOT

This application claims priority to Chinese Patent Application No. 202010472093.3, filed on May 29, 2020, in China National Intellectual Property Administration and entitled "PCIE Device, Apparatus, and Method with Different PCIE Bandwidths Compatible in Same Slot", the contents of which are hereby incorporated by reference in its entirety.

FIELD

The present disclosure relates to the field of Peripheral Component Interconnect Express (PCIE) devices, and particularly to a PCIE device, apparatus, and method with different PCIE bandwidths compatible in the same PCIE slot.

BACKGROUND

In a server system, various devices may be mounted to a PCIE bus of a main board, including a hard disk, a network card, a Serial Attached Small Computer System Interface (SCSI) (SAS)/Redundant Array of Independent Disks (RAID) card, and other external cards. PCIE implements high-speed serial point-to-point dual-channel high-bandwidth transmission, and the connected PCIE device is allocated with an exclusive channel bandwidth, and does not share any bus bandwidth. In practical board design, it is necessary to clarify and correctly set, under a Basic Input Output System (BIOS), the bandwidth needed by the device, thereby ensuring the normal operation of the device. The BIOS is a set of programs burned to a Read-Only Memory (ROM) in the server main board, and the program stores a basic input output program, power-on self-test program, and system self-startup program for a computer.

Based on the characteristic of PCIE that the bandwidth supports downward compatibility, a port set to an X16 bandwidth is downwards compatible with X8, X4, X2, and X1 devices. In server configuration, multiple PCIE X8 devices may sometimes be needed, resulting in insufficient PCIE X8 slots. In such case, the X8 devices may be plugged to X16 slots for use. As a result, PCIE X16 slots in a Riser card are wasted. For example, two PCIE X8 devices are plugged to two PCIE X16 slots, and one X16 slot may not support two X8 devices.

SUMMARY

In order to solve the foregoing problem, the present disclosure provides a PCIE device, apparatus, and method with different PCIE bandwidths compatible in the same PCIE slot. One X2N slot may support two XN devices.

The technical solutions of the present disclosure are as follows. A PCIE device with different PCIE bandwidths compatible in the same PCIE slot is provided, including a PCIE single board. A first core chip corresponding to a first PCIE XN device and a second core chip corresponding to a second PCIE XN device are arranged on the PCIE single board. An XN+XN gold finger is further arranged on a body of the PCIE single board. The XN+XN gold finger is formed by two XN gold fingers. The PCIE single board forms a PCIE XN+XN device, wherein N is any one of 1, 2, 4, and 8.

Further, a bandwidth Identifier (ID) pin is configured on the XN+XN gold finger on the PCIE single board.

Further, the bandwidth ID pin is a reserved pin of one of the XN gold fingers, and the reserved pin is grounded.

The technical solutions of the present disclosure also include an apparatus with different PCIE bandwidths compatible in the same PCIE slot based on the PCIE device, including a main board and a PCIE expansion card, an X2N slot being formed in the PCIE expansion card. The PCIE expansion card is plugged with the PCIE device through the X2N slot. The PCIE device is a PCIE X2N device or a PCIE XN+XN device.

A pin at the X2N slot of the PCIE expansion card is pulled up to a power supply, and the ID pin corresponds to a bandwidth ID pin of the PCIE XN+XN device. A signal of the ID pin at the X2N slot of the PCIE expansion card is named Present signal.

The PCIE expansion card transmits the Present signal and bandwidth configuration information to the main board, and the main board configures a corresponding bandwidth for the X2N slot according to the Present signal and the bandwidth configuration information.

Further, a Platform Controller Hub (PCH) chip and a Slimline connector are arranged on the main board. The PCIE expansion card is connected with the PCH chip through the Slimline connector. The PCH chip is connected with the Slimline connector through at least one 2-to-1 analog switch.

A BIOS program is configured on the main board. The bandwidth configuration information includes default configuration information and alternate configuration information.

The PCIE expansion card transmits the Present signal to a control end of the 2-to-1 analog switch through the Slimline connector, and transmits the bandwidth configuration information to an input end of the 2-to-1 analog switch through the Slimline connector. The 2-to-1 analog switch gates a channel according to the Present signal, and transmits the default configuration information or the alternate configuration information to the PCH chip.

Further, M General Purpose Input Output (GPIO) pins are arranged on the PCH chip, and each of the GPIO chips is connected with the Slimline connector through a 2-to-1 analog switch.

The bandwidth configuration information is an address code identified with 0 and 1 and including M bits. An address code of the alternate configuration information is obtained by negating corresponding bits of an address code of the default configuration information, wherein M is an integer greater than 1.

Further, the PCIE expansion card is a Riser card.

The technical solutions of the present disclosure also include a method with different PCIE bandwidths compatible in the same PCIE slot based on the apparatus, including the following steps:

plugging a certain PCIE device into the PCIE expansion card with the X2N slot;

transmitting, by the PCIE expansion card, a Present signal and bandwidth configuration information to the main board;

when the Present signal is a high level and the bandwidth configuration information received by the main board is default configuration information, indicating that the plugged PCIE device is a PCIE X2N device, configuring, by the main board, an X2N bandwidth for the X2N slot of the PCIE expansion card; and when the Present signal is a low level and the bandwidth configuration information received by the main board is alternate configuration information, indicating that the plugged PCIE device is a PCIE XN+XN device, configuring, by the main board, an XN+XN bandwidth for the X2N slot of the PCIE expansion card.

Figure 1:
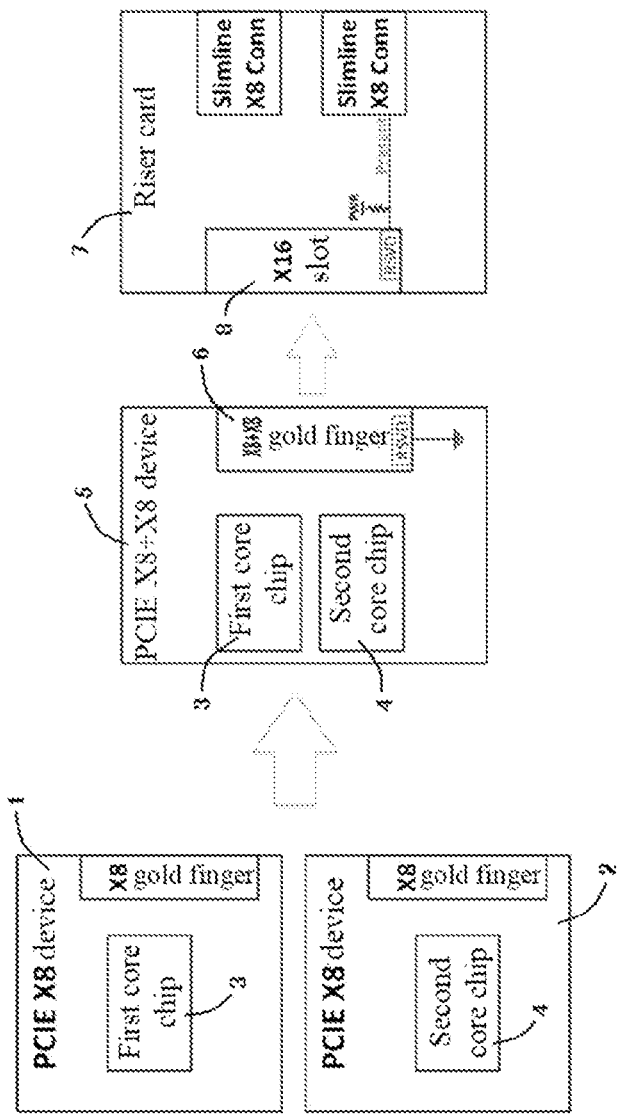
FIG. 1 is a schematic diagram of a principle structure according to specific embodiment 1 of the present disclosure.

In the drawings: 1-first PCIE XN device; 2-second PCIE XN device; 3-first core chip; 4-second core chip; 5-PCIE XN+XN device; 6-XN+XN gold finger; 7-PCIE expansion card; 8-X2N gold finger; 9-PCIE X2N device; 10-main board; 11-Slimline connector; 12-PCH chip; and 13-2-to-1 analog switch.

DETAILED DESCRIPTION

The present disclosure will be described below in detail in combination with the drawings through specific embodiments. The following embodiments are for explaining the present disclosure. The present disclosure not limited to the following implementation modes.

Embodiment 1

The present embodiment provides a PCIE device with different PCIE bandwidths compatible in the same PCIE slot. As shown in FIG. 1, the principle of the present embodiment is presented taking two PCIE X8 devices forming a PCIE X8+X8 device as an example.

The PCIE device of the present embodiment includes a PCIE single board. A first core chip corresponding to a first PCIE XN device and a second core chip corresponding to a second PCIE XN device are arranged on the PCIE single board. An XN+XN gold finger is further arranged on a body of the PCIE single board. The XN+XN gold finger is formed by two XN gold fingers. The PCIE single board forms a PCIE XN+XN device. That is, the two PCIE XN devices are designed into the PCIE XN+XN device. Here, N is any one of 1, 2, 4, and 8.

As used herein, the "N" in PCIe XN represents the number of Lane. Common PCIe chips are generally PCIe X1, PCIe X2, PCIe X4, PCIe X8, PCIe X16, PCIe X32.

The PCIE XN+XN device may be plugged into a PCIE expansion card with an X2N slot. The PCIE expansion card may be a Riser card. In FIG. 1, Slimline X8Conn represents an X8 slot of a connector. The PCIE expansion card may be plugged with both a PCIE X2N device and a PCIE XN+XN device.

In order to enable a main board to recognize a type of a device plugged into the PCIE expansion card to facilitate bandwidth configuration, a bandwidth ID pin is configured on the XN+XN gold finger on the PCIE single board. The bandwidth ID pin is a reserved pin (i.e., RSVD pin) of one of the XN gold fingers, and the reserved pin is grounded.

Embodiment 2

Figure 2:
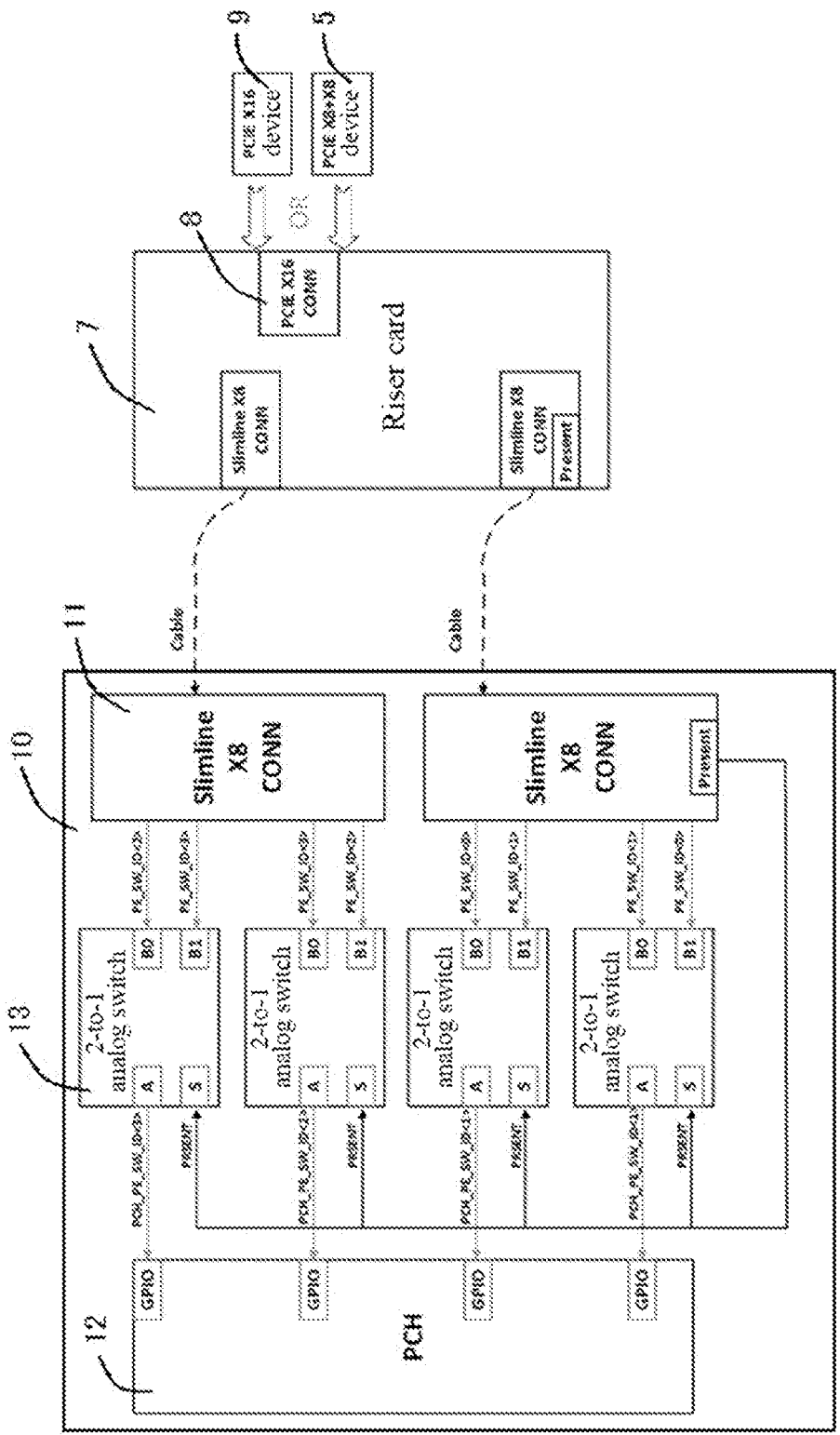
FIG. 2 is a schematic diagram of a principle structure according to specific embodiment 2 of the present disclosure.

Based on the PCIE device of embodiment 1, the present embodiment provides an apparatus with different PCIE bandwidths compatible in the same PCIE slot. As shown in FIG. 2, a principle structure of the apparatus is presented taking a PCIE expansion card with an X16 slot as an example.

The apparatus includes a main board and a PCIE expansion card. The PCIE expansion card may be a Riser card. An X2N slot is formed in the PCIE expansion card. The PCIE expansion card is plugged with the PCIE device through the X2N slot. The PCIE device is a PCIE X2N device or a PCIE XN+XN device. In FIG. 2, PCIE X16CONN represents an X16 slot of the PCIE expansion card.

Similarly, in order to enable the main board to recognize a type of a device plugged into the PCIE expansion card, a pin at the X2N slot of the PCIE expansion card is pulled up to a power supply, and the ID pin corresponds to a bandwidth ID pin of the PCIE XN+XN device. A signal of the ID pin at the X2N slot of the PCIE expansion card is named Present signal. It is to be noted that the ID pin is a reserved pin (RSVD pin) of the X2N slot. When the PCIE expansion card is plugged with the PCIE XN+XN device, the Present signal is a low level. When the PCIE expansion card is plugged with the PCIE X2N device, the Present signal is a high level. For example, the PCIE expansion card is provided with an X16 slot, and may be plugged with a PCIE X16 device and a PCIE X8+X8 device. In such case, when the PCIE X16 device is plugged, the Present signal is a high level, and when the PCIE X8+X8 device is plugged, the Present signal is a low level.

The PCIE expansion card transmits the Present signal and bandwidth configuration information to the main board, and the main board configures a corresponding bandwidth for the X2N slot according to the Present signal and the bandwidth configuration information. When the PCIE X16 device is plugged, an X16 bandwidth is configured. When the PCIE X8+X8 device is plugged, an X8+X8 bandwidth is configured.

Specifically, a PCH chip and a Slimline connector are arranged on the main board. The PCIE expansion card is connected with the PCH chip through the Slimline connector. The PCH chip is connected with the Slimline connector through at least one 2-to-1 analog switch. It is to be noted that the PCIE expansion card is connected with the Slimline connector through a cable.

A BIOS program is configured on the main board. The bandwidth configuration information includes default configuration information and alternate configuration information. The default configuration information corresponds to the plugged PCIE X2N device. The alternate configuration information corresponds to the plugged PCIE XN+XN device.

The PCIE expansion card transmits the Present signal to a control end of the 2-to-1 analog switch through the Slimline connector, and transmits the bandwidth configuration information to an input end of the 2-to-1 analog switch through the Slimline connector. The 2-to-1 analog switch gates a channel according to the Present signal, and transmits the default configuration information or the alternate configuration information to the PCH chip.

In the present embodiment, M GPIO pins are arranged on the PCH chip, and each of the GPIO chips is connected with the Slimline connector through a 2-to-1 analog switch.

The bandwidth configuration information is an address code identified with 0 and 1 and including M bits. An address code of the alternate configuration information is obtained by negating corresponding bits of an address code of the default configuration information, wherein M is an integer greater than 1. If M is 4, the bandwidth configuration information is represented by a 4-bit address code. If the address code of the default configuration information is set to 0101, the address code of the alternate configuration information is 1010. It is to be noted that a gating rule of the 2-to-1 analog switch is pre-configured. When the Present signal is a high level, each 2-to-1 analog switch gates a corresponding channel, the PCH chip receives the address code of 0101, and the BIOS program reads the address code, and configures an X2N bandwidth for the PCIE expansion card. When the Present signal is a low level, each 2-to-1 analog switch gates a corresponding channel, the PCH chip receives the address code of 1010, and the BIOS program reads the address code, and configures an XN+XN bandwidth for the PCIE expansion card.

Embodiment 3

Figure 3:
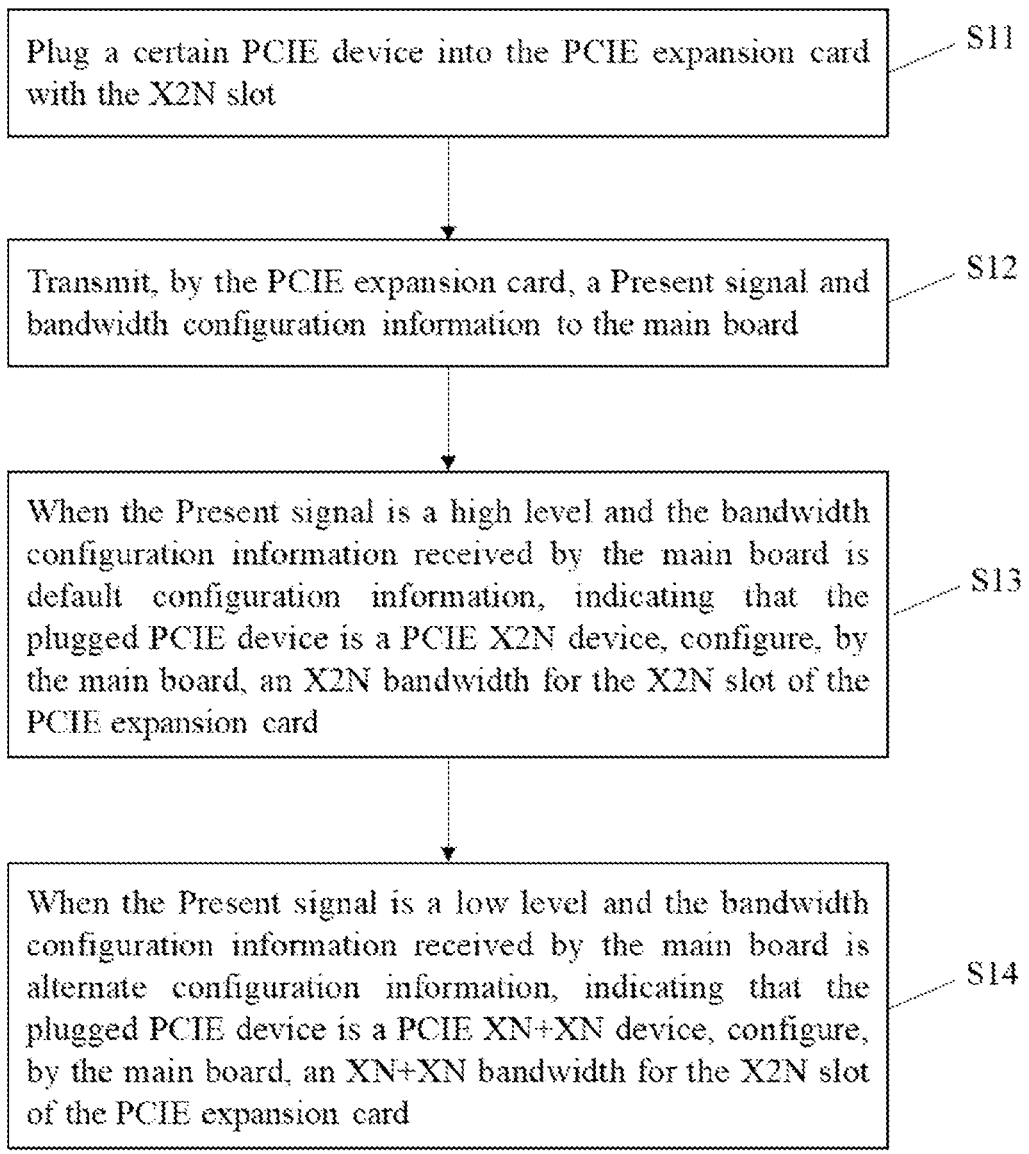
FIG. 3 is a schematic flowchart of a method according to specific embodiment 3 of the present disclosure.

As shown in FIG. 3, based on embodiment 2, the present embodiment provides a method with different PCIE bandwidths compatible in the same PCIE slot, including the following steps.

In S11, plug a certain PCIE device into the PCIE expansion card with the X2N slot.

In S12, transmit, by the PCIE expansion card, a Present signal and bandwidth configuration information to the main board.

In S13, when the Present signal is a high level and the bandwidth configuration information received by the main board is default configuration information, indicating that the plugged PCIE device is a PCIE X2N device, configure, by the main board, an X2N bandwidth for the X2N slot of the PCIE expansion card.

In S14, when the Present signal is a low level and the bandwidth configuration information received by the main board is alternate configuration information, indicating that the plugged PCIE device is a PCIE XN+XN device, configure, by the main board, an XN+XN bandwidth for the X2N slot of the PCIE expansion card.

Based on the above embodiments, a specific implementation mode will be provided below taking a PCIE X8 device as an example in combination with the principle of the present disclosure, FIG. 1, and FIG. 2, whereby the present disclosure is further described in detail.

Two PCIE X8 devices are designed into a PCIE X8+X8 device. There are two core chips and an X8+X8 gold finger on the X8+X8 device. The X8+X8 gold finger may be plugged into a PCIE X16 slot of a server Riser card.

An RSVD pin of the X8+X8 gold finger on the PCIE X8+X8 device is selected to be connected with GND. A corresponding RSVD pin of the Riser card is selected to be pulled up to a power supply, and a signal of the RSVD pin of the Riser card is named Present signal. As such, when the Present signal is a low level, it indicates that the PCIE X8+X8 device is in place at the X16 slot of the Riser card. When the Present signal is a high level, it indicates that the PCIE X8+X8 device is not in place.

After the PCIE X8+X8 device is plugged into the PCIE X16 slot of the Riser card, the main board needs to be capable of recognizing that the PCIE device is X8+X8, and configures the slot to an X8+X8 bandwidth. It is to be noted that, to implement the configuration of a PCIE bandwidth, a certain bandwidth ID coding rule is set in a BIOS program, and a 4-bit bandwidth ID value may be used for coding, whereby the server supports configuration of most PCIE devices. All 4-bit bandwidth ID code signals PE<0 . . . n>_SW_ID<3 . . . 0> on the main board are pulled down, implemented on the Riser card by pull-up and pull-down resistors. The Riser card transmits values of the signals PE<0 . . . n>_SW_ID<3 . . . 0> to a Slimline connector of the main board through a Slimline connector and a cable. The main board connects the signals PE<0 . . . n>_SW_ID<3 . . . 0> to GPIO pins of a PCH chip. The BIOS program reads the bandwidth ID code value on the GPIO pin, thereby implementing the configuration of the PCIE bandwidth by use of the corresponding bandwidth ID coding rule in the BIOS program.

Therefore, the present specific implementation mode proposes a PCIE bandwidth coding rule. When the PCIE bandwidth is configured to an X16 bandwidth, PE_SW_ID<3 . . . 0> is coded into 0101. When the PCIE bandwidth is configured to an X8+X8 bandwidth, PE_SW_ID<3 . . . 0> is coded into 1010. It can be seen from the coding rule that values of the two higher bits and two lower bits of the 4-bit ID code 0101 of the X16 bandwidth may be swapped respectively to obtain 1010, thereby setting the bandwidth of the slot to X8+X8. Therefore, the PCIE X16 slot of the Riser card may recognize both a device of a PCIE X16 bandwidth and a PCIE device of an X8+X8 bandwidth.

In the present specific implementation mode, the Present and PCH_PE_SW_ID<3 . . . 0> signals on the Slimline connector of the Riser card are transmitted to the Slimline connector of the main board through the cable. The main board connects the Present signal to an S pin of a 2-to-1 analog switch. An implementation logic of the 2-to-1 analog switch is as shown in Table 1. When Present is a high level, namely the PCIE X8+X8 device is not in place, PCH_PE_SW_ID<3 . . . 0> is assigned to PE_SW_ID<3 . . . 0> respectively. That is, the default value 0101 is directly read from the Riser card and sent to the GPIO pin of the PCH chip, and the BIOS program reads the value on the pin, and configures the bandwidth of the slot to the X16 bandwidth by parsing. When Present is a low level, namely the PCIE X8+X8 device is in place, PCH_PE_SW_ID<3 . . . 0> is assigned to PE_SW_ID<2,3,1,0> respectively. That is, the third bit and second bit of the PE_SW_ID value are swapped, and meanwhile, the first bit and the zeroth bit are swapped. Then, the value of PCH_PE_SW_ID<3 . . . 0> read by the PCH chip is 1010, and the BIOS program configures the bandwidth of the slot to the X8+X8 bandwidth by parsing.

TABLE 1

| Implementation Logic of 2-to-1 Analogue Switch | |
|---|---|
| S | A |
| S = L (low level) | A = B0 |
| S = H (high level) | A = B1 |

According to the PCIE device, apparatus, and method with different PCIE bandwidths compatible in the same PCIE slot in the present disclosure, a PCIE XN+XN device is arranged, and may be plugged into an X2N slot, and meanwhile, a corresponding ID pin is configured, whereby a main board configures a corresponding bandwidth according to the ID pin. According to the present disclosure, slot spaces are saved for configuring multiple PCIE XN devices, the same PCIE X2N slot can support both a device of an X2N bandwidth and a device of an XN+XN bandwidth, and a design that the same slot is compatible with different PCIE devices is achieved.

The above is only the preferred implementation mode of the present disclosure but not intended to limit the present disclosure. Any uncreative variation apparent to those skilled in the art and a plurality of improvements and embellishments made without departing from the principle of the present disclosure shall fall within the scope of protection of the present disclosure.

What is claimed is:

1. An apparatus, comprising a main board, a Peripheral Component Interconnect Express (PCIE) expansion card and a PCIE device;

wherein the PCIE device comprises a PCIE single board which is provided with a first core chip corresponding to a first PCIE XN device and a second core chip corresponding to a second PCIE XN device, the PCIE single board is further provided an XN+XN gold finger which is formed by two XN gold fingers, a bandwidth Identifier (ID) pin is configured on the XN+XN gold finger, and the PCIE single board forms a PCIE XN+XN device, and N is any one of 1, 2, 4, and 8;

wherein the PCIE expansion card is provided with an X2N slot the PCIE device is plugged into the PCIE expansion card through the X2N slot, and the PCIE device is a PCIE X2N device or the PCIE XN+XN device;

wherein a pin at the X2N slot of the PCIE expansion card is pulled up to a power supply, an Identifier (ID) pin corresponds to the bandwidth ID pin of the PCIE XN+XN device, and a signal of the ID pin at the X2N slot of the PCIE expansion card is named Present signal; and wherein the PCIE expansion card transmits the Present signal and bandwidth configuration information to the main board, and the main board configures a corresponding bandwidth for the X2N slot according to the Present signal and the bandwidth configuration information.

2. The apparatus according to claim 1, wherein a Platform Controller Hub (PCH) chip and a Slimline connector are arranged on the main board; the PCIE expansion card is connected with the PCH chip through the Slimline connector; and the PCH chip is connected with the Slimline connector through at least one 2-to-1 analog switch;

a Basic Input Output System (BIOS) program is configured on the main board; and the bandwidth configuration information comprises default configuration information and alternate configuration information;

the PCIE expansion card transmits the Present signal to a control end of the 2-to-1 analog switch through the Slimline connector, and the PCIE expansion card transmits the bandwidth configuration information to an input end of the 2-to-1 analog switch through the Slimline connector; and the 2-to-1 analog switch gates a channel according to the Present signal, and transmits the default configuration information or the alternate configuration information to the PCH chip.

3. The apparatus according to claim 2, wherein M General Purpose Input Output (GPIO) pins are arranged on the PCH chip, and each of the GPIO pins is connected with the Slimline connector through the 2-to-1 analog switch;

the bandwidth configuration information is an address code identified with 0 and 1 and comprising M bits; and an address code of the alternate configuration information is obtained by negating corresponding bits of an address code of the default configuration information, wherein M is an integer greater than 1.

4. The apparatus according to claim 3, wherein the PCIE expansion card is a Riser card.

5. The apparatus according to claim 2, wherein the PCIE expansion card is connected with the Slimline connector through a cable.

6. The apparatus according to claim 2, wherein the default configuration information corresponds to the PCIE X2N device that is plugged with the PCIE expansion card.

7. The apparatus according to claim 2, wherein the alternate configuration information corresponds to the PCIE XN+XN device that is plugged with the PCIE expansion card.

8. The apparatus according to claim 1, wherein when the PCIE expansion card is plugged with the PCIE XN+XN device, the Present signal is a low level.

9. The apparatus according to claim 1, wherein when the PCIE expansion card is plugged with the PCIE X2N device, the Present signal is a high level.

10. The apparatus according to claim 1, wherein the PCIE expansion card is provided with an X16 slot, and is configured to be plugged with a PCIE X16 device or a PCIE X8+X8 device.

11. The apparatus according to claim 10, wherein when the PCIE X16 device is plugged with the PCIE expansion card, the Present signal is a high level, and when the PCIE X8+X8 device is plugged with the PCIE expansion card, the Present signal is a low level.

12. The apparatus according to claim 10, wherein when the PCIE X16 device is plugged with the PCIE expansion card, an X16 bandwidth is configured, and when the PCIE X8+X8 device is plugged with the PCIE expansion card, an X8+X8 bandwidth is configured.

13. The apparatus according to claim 1, wherein the bandwidth ID pin is a reserved pin of one of the two XN gold fingers, and the reserved pin is grounded.

14. A method implemented by an apparatus comprising a main board, a Peripheral Component Interconnect Express (PCIE) expansion card and a PCIE device;

wherein the PCIE device comprises a PCIE single board which is provided with a first core chip corresponding to a first PCIE XN device and a second core chip corresponding to a second PCIE XN device, the PCIE single board is further provided an XN+XN gold finger which is formed by two XN gold fingers, a bandwidth Identifier (ID) pin is configured on the XN+XN gold finger, and the PCIE single board forms a PCIE XN+XN device, and N is any one of 1, 2, 4, and 8;

wherein the PCIE expansion card is provided with an X2N slot, the PCIE device is plugged into the PCIE expansion card through the X2N slot, and the PCIE device is a PCIE X2N device or the PCIE XN+XN device;

wherein a pin at the X2N slot of the PCIE expansion card is pulled up to a power supply, an Identifier (ID) pin corresponds to the bandwidth ID pin of the PCIE XN+XN device, and a signal of the ID pin at the X2N slot of the PCIE expansion card is named Present signal; and wherein the PCIE expansion card transmits the Present signal and bandwidth configuration information to the main board, and the main board configures a corresponding bandwidth for the X2N slot according to the Present signal and the bandwidth configuration information;

and wherein the method comprises the following steps:
plugging a certain PCIE device into the PCIE expansion card with the X2N slot;

transmitting, by the PCIE expansion card, the Present signal and the bandwidth configuration information to the main board;

when the Present signal is a high level and the bandwidth configuration information received by the main board is default configuration information, indicating that the plugged PCIE device is the PCIE X2N device, configuring, by the main board, an X2N bandwidth for the X2N slot of the PCIE expansion card; and when the Present signal is a low level and the bandwidth configuration information received by the main board is alternate configuration information, indicating that the plugged PCIE device is the PCIE XN+XN device, configuring, by the main board, an XN+XN bandwidth for the X2N slot of the PCIE expansion card.

15. The method according to claim 5, wherein the bandwidth ID pin is a reserved pin of one of the two XN gold fingers, and the reserved pin is grounded.

16. The method according to claim 5, wherein the PCIE XN+XN device is plugged into the PCIE expansion card with the X2N slot.

17. The method according to claim 5, wherein the PCIE expansion card is configured to be plugged with both the PCIE X2N device and the PCIE XN+XN device.

* * * * *